United States Patent [19]
Marsden

[11] Patent Number: 6,025,922
[45] Date of Patent: Feb. 15, 2000

[54] REDUCTION OF BANDING IN PRINTED IMAGES

[75] Inventor: Jonathan Marsden, Sunnyvale, Calif.

[73] Assignee: Electronics for Imaging, Foster City, Calif.

[21] Appl. No.: 09/216,333

[22] Filed: Dec. 18, 1998

[51] Int. Cl.$^7$ ................................................ G06F 15/00
[52] U.S. Cl. ............................................ 358/1.1; 358/1.6
[58] Field of Search .................... 358/1.19, 1.1, 358/1.15, 1.6, 401

[56] References Cited

U.S. PATENT DOCUMENTS

| | | | |
|---|---|---|---|
| 3,982,426 | 9/1976 | NewHouse | 73/67.5 R |
| 4,583,128 | 4/1986 | Anderson, Jr. et al. | 358/302 |
| 4,746,940 | 5/1988 | Lee | 346/160 |
| 4,803,497 | 2/1989 | Kennedy, Jr. et al. | 346/108 |
| 4,860,356 | 8/1989 | Viser | 381/41 |
| 5,105,451 | 4/1992 | Lubinsky et al. | 378/28 |
| 5,179,641 | 1/1993 | Comins et al. | 395/132 |
| 5,406,379 | 4/1995 | Kingsley et al. | 358/298 |
| 5,430,472 | 7/1995 | Curry | 347/232 |
| 5,539,667 | 7/1996 | Rode | 364/525 |
| 5,659,843 | 8/1997 | Takano et al. | 399/66 |
| 5,754,750 | 5/1998 | Butterfield | 395/118 |

FOREIGN PATENT DOCUMENTS

| | | | |
|---|---|---|---|
| 0763762A1 | 3/1997 | European Pat. Off. | G02B 26/12 |
| 0768577A1 | 4/1997 | European Pat. Off. | G03G 13/08 |
| 0827005A2 | 3/1998 | European Pat. Off. | G02B 26/12 |

Primary Examiner—Jerome Grant, II
Attorney, Agent, or Firm—Michael A. Glenn

[57] ABSTRACT

A method and apparatus is provided for adding pseudo-random noise and bias to an input pixel value to reduce banding effects and to produce additional highlights in the output. The method adds the value of a bias function and a pseudo-random noise value to the input pixel value. The sum is shifted a predetermined number of spaces. The result of the shifting step is then added to the input pixel value. A predetermined constant is subtracted from the above sum. A clipping procedure is then applied to calculate the final output value. Three properties of the bias function are to have a value of no ink map to a value of no ink, to have a value of full ink map to a value of full ink, and to add highlights.

16 Claims, 6 Drawing Sheets

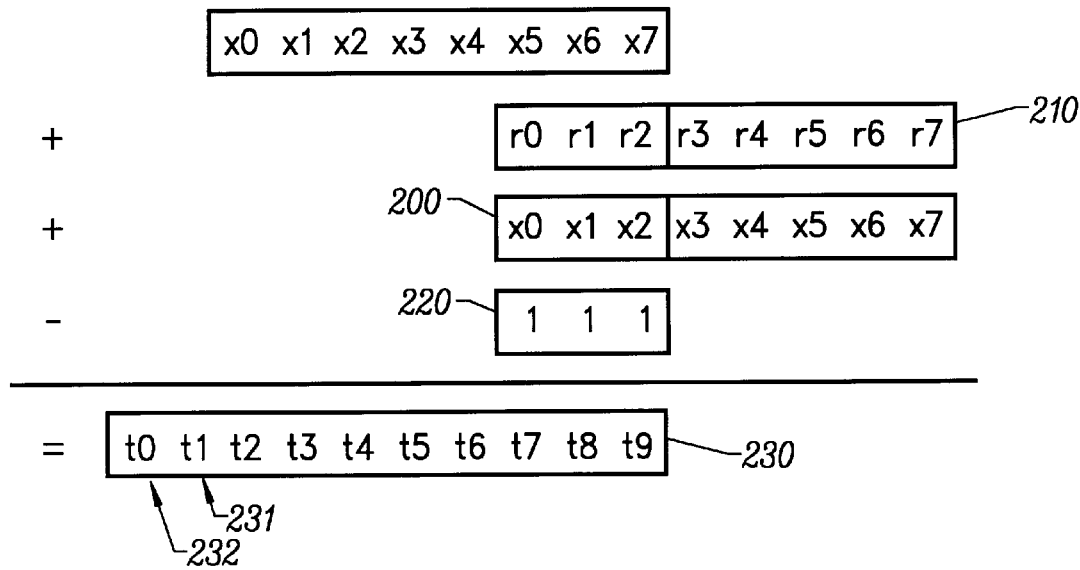
*FIG. 3A*
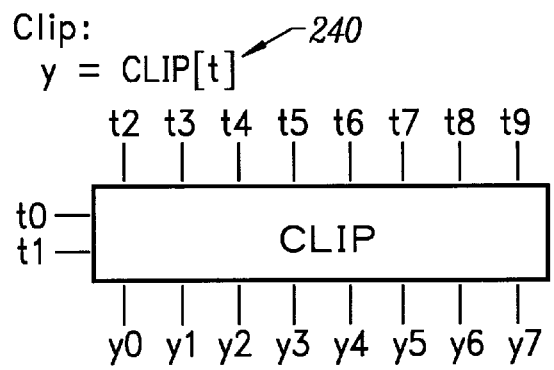
*FIG. 3B*
| t0 | t1 | y0 | y1 | y2 | y3 | y4 | y5 | y6 | y7 | |
|----|----|----|----|----|----|----|----|----|----|----|
| 0 | 0 | t2 | t3 | t4 | t5 | t6 | t7 | t8 | t9 | —242 |
| 0 | 1 | 1 | 1 | 1 | 1 | 1 | 1 | 1 | 1 | —241 |
| 1 | 0 | 0 | 0 | 0 | 0 | 0 | 0 | 0 | 0 | —243 |
| 1 | 1 | 0 | 0 | 0 | 0 | 0 | 0 | 0 | 0 | |
*FIG. 3C*

REDUCTION OF BANDING IN PRINTED IMAGES

BACKGROUND OF THE INVENTION

1. Field of the Invention

The invention relates to the printing of images. More particularly, the invention relates to a method and apparatus for reducing banding in printed images and for adding highlights to printed images.

2. Description of Prior Art

The printing of images is a broad technical field that includes the conversion of an original image produced in one image system to an output image in another image system. Original or input images are commonly produced, for example, by scanners and computer monitors. Output images are commonly produced, for example, by color laser printers and film recorders.

The conversion process described above is known as color reproduction. One of the objectives in color reproduction is to maintain the color and tone of an original image in an output image after conversion. For example, when a user creates an original image on a computer workstation, the user usually desires the same colors and tones on a printout of this image. Because conversion from one image system to another is not always perfect, many times a general process referred to as color correction is required. Some of the color correction and tone correction tools currently in use include calibration and color management systems. For a comprehensive discussion on color reproduction refer to Marc Miller and Randy Zaucha, *The Color Mac, Second Edition*, Hayden Books, (1995).

Sometimes color and tonal corrections must be applied to the input signals of an image rendering device to compensate for the device limitations in creating output. For example, in some cases the color and tone input signals are correct for an image when taken as a whole. However, within the image, sharp changes from one color or tone value to another may be present. That is, some intensity level changes of color or tone are discernible to the human eye as distinct bands of color or tone when the level changes are meant to change in a gradual fashion. The presence of this artifact is commonly known as banding. Technically, banding occurs when consecutive intensity values of pixels have sufficient visible difference to result in banding.

The prior art has addressed the problem of reducing banding by adding pseudo-random noise to discrete pixel values. Adding noise to pixel values makes a boundary between one color or tone value and the next color or tone value seem to disappear. That is, the change in intensity between colors and tones appear blended to the human eye rather than as discrete steps. Refer to Todd Comins and Willem Engelse, Rendering Shaded Areas with Boundary-Localized Pseudo-Random Noise, U.S. Pat. No. 5,179,641 (Jan. 12, 1993). This prior art technique uses pseudo-random noise localized to image boundaries. Pixel values are calculated using arithmetic accuracy larger than the word size of an associated bitmap memory. The pixel value has a most significant and least significant portion. Noise is added to the least significant portion resulting in a carry over to the most significant portion. While the result is a more natural display due to blending of color and tone boundaries, a problem of ensuring that the white color and highlighted area remain white and highlighted is not addressed.

A second prior art method and apparatus disclosed in Christian S. Rode, Method and Apparatus For Improved Digital Film Recorder, U. S. Pat. No. 5,539,667 (Jul. 23, 1996) also adds noise to an input signal to break up any bunching of error patterns or banding effects. A main objective of said system is to take a high-resolution input image and scale the image down in size to improve the film recording time of the image. But before the input signal is passed to a quantizing function, a quantization error signal from a previous input signal and a pseudo random noise signal are added. The purpose is to diffuse and disperse any added quantization errors and to reduce unwanted visual artifacts in the output image due to repeating quantization error. This prior art does not address the problem of adding noise to highlighted areas.

Other prior art teachings have identified banding as a mechanical problem in the hardware and have defined banding in mechanical terms. They offer solutions in the hardware. In Denny L. Y. Lee, Line Scanner to Reduce Banding, U.S. Pat. No. 4,746,940 (May 24, 1988) vertical banding is generally attributed to irregularities in the radiation source. Lee describes how it is a problem particularly with scanning exposure sources which involve repeatedly traversing an information carrying, intensity modulated, beam of radiation over the surface of an imaging element while the imaging element is driven in a direction generally perpendicular to the traversing beam direction. Lee's solution involves transporting a film sheet in a control system past a first and second spaced position whereat the same portion of the film sheet is exposed to an imaging beam having the same information.

In Robert J. Lawton, and Daniel R. Marshall, Beam Deflecting for Resolution Enhancement and Banding Reduction in a Laser Printer, European Patent Application EP 0 763 762 A1 (Mar. 13, 1996) banding is reduced by deflecting the beam to compensate for drum rotational and translation errors.

In David K. Towner, Robert J. Lawton, and Daniel R. Marshall, Beam Deflecting for Enhanced Laser Printing Scanning, European Patent Application EP 0 827 005 A2 (Jan. 21, 1997) the principal cause of banding is considered to be primarily speed reducer gear noise. Towner et al describe how gear noise results from imperfect spacing of gear teeth, variances in flexing of gear teeth as forces are transferred from one gear to the next, and other intrinsic variations in gear force transfer. The Towner et al document discloses a two-dimensional periodic trajectory scan path for a laser beam across a photoconductive surface in a laser printer.

Finally, in Douglas N. Curry, Method and Apparatus Eliminating Distortion via Overscanned Illumination for Optical Printer ad the Like Having High Gamma Photosensitive Recording Media and High Addressability, U.S. Pat. No. 5,430,472 (Jul. 4, 1995) banding is defined to be caused by the effective scanning rate of the print engine departing from the data writing rate of the scanning beam. A suggested way to eliminate banding involves compensating for the photoreceptor drum rotating either too fast or too slow. Another suggestion is to modify the data writing rate to the effective scanning rate.

It would be advantageous to provide a method and apparatus to render the boundary between one color or tone intensity level and another color or tone intensity level smooth to the human eye, while at the same time ensuring that a no ink value is mapped to a no ink value and a full ink value is mapped to a full ink value.

SUMMARY OF THE INVENTION

The invention provides a simple and fast method and apparatus for adding pseudo-random noise and bias to input pixel values to reduce banding effects and to produce additional highlights in the output. The preferred embodiment of the invention compensates for the problem of banding, which occurs when consecutive intensity values of pixels have sufficient visible difference to result in such banding. The invention adds noise that is produced by a pseudo-random noise generator. A bias is also added to the input pixel value. The bias varies as a function of the input pixel value. Effectively, the bias adjusts the mean value of pixels in the direction of a no ink value when a group of pixels are in the highlight area. The bias effectively adjusts the mean value of pixels towards a full ink value when a group of pixels are in the shadow area. The bias effectively makes no adjustment to the mean value of pixels when a group of pixels are in the middle tonal range. Finally, the sum of the input pixel value, noise, bias, and a predetermined number is clipped. This process may be performed separately for each primary color in any color space, for example, the cyan, magenta, yellow, and black (CMYK) color space.

BRIEF DESCRIPTION OF THE DRAWINGS

FIG. 3a is a computation diagram;

FIG. 3b is a diagram showing a clipping processor;

FIG. 3c is a clipping truth table;

DETAILED DESCRIPTION OF INVENTION

The invention provides a simple and fast method and apparatus for adding pseudo-random noise and bias to input pixel values to reduce banding effects and to produce additional highlights in the output. The preferred embodiment of the invention compensates for the problem of banding, which occurs when consecutive intensity values of pixels have sufficient visible difference to result in such banding. The invention adds noise that is produced by a pseudo-random noise generator. A bias is also added to the input pixel value. The bias varies as a function of the input pixel value. Effectively, the bias adjusts the mean value of pixels in the direction of a no ink value when a group of pixels are in the highlight area. The bias effectively adjusts the mean value of pixels towards a full ink value when a group of pixels are in the shadow area. The bias effectively makes no adjustment to the mean value of pixels when a group of pixels are in the middle tonal range. Finally, the sum of the input pixel value, noise, bias, and a predetermined number is clipped. This process must be performed separately for each primary color in any color space, for example, the cyan, magenta, yellow, and black (CMYK) color space. For purposes of the discussion herein, the word "ink" shall be used to refer to ink, dye, toner, and any other substance that may be used to mark a substrate.

Figure 1:
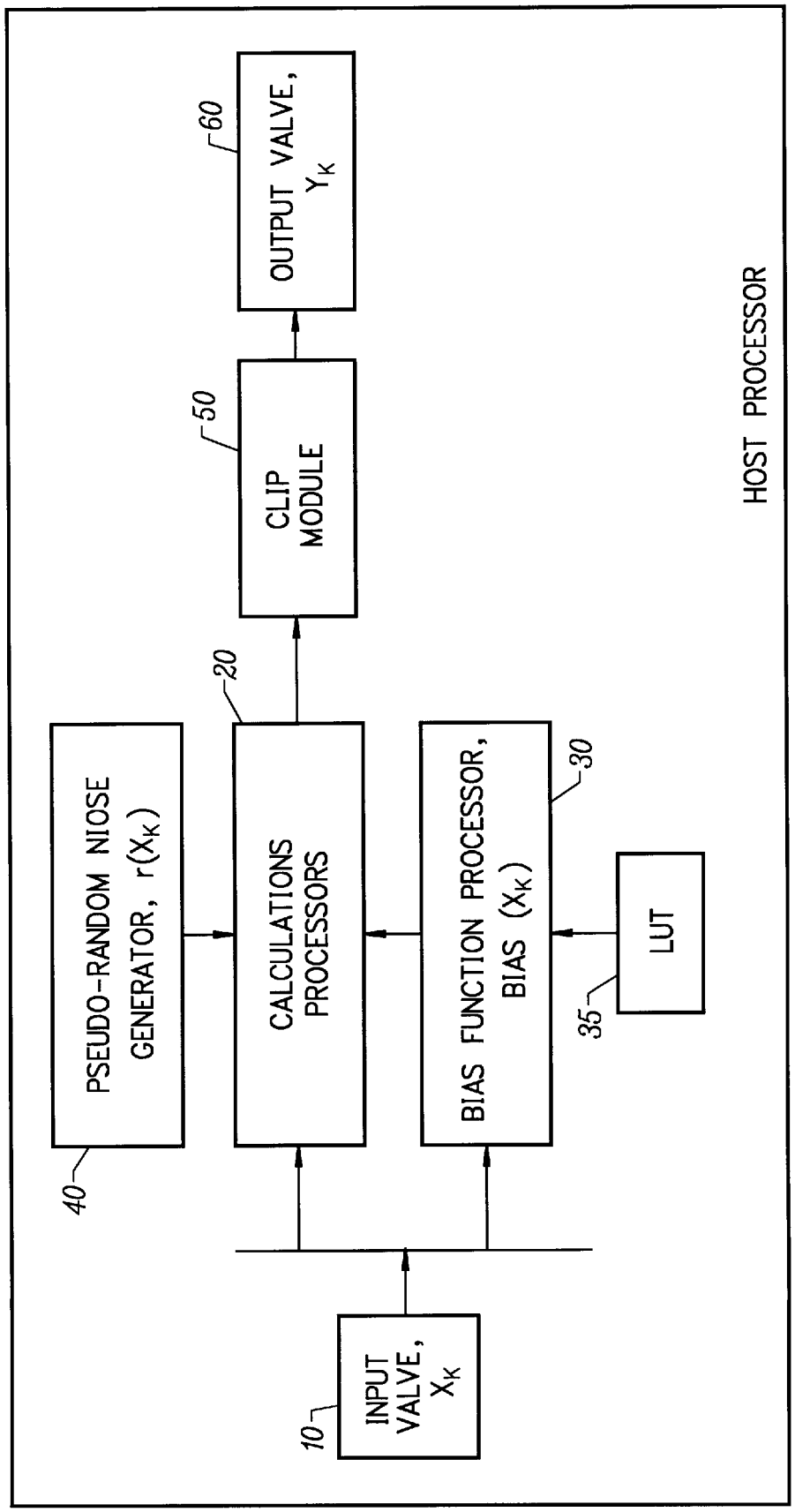
FIG. 1 is a block schematic diagram showing the major components of a preferred embodiment of the invention for a single color channel.

FIG. 1 is a schematic diagram showing the major components of a preferred embodiment of the invention for a single color channel. An input pixel value 10 is sent to a calculations processor 20 and to a bias function processor 30. The bias function, which is a function of the input pixel value x, calculates a bias that may in some embodiments of the invention include retrieving values from the lookup table (LUT) 35, and thereby provides the bias to the calculations processor 20. A pseudo-random noise generator 40 generates a number and provides said number to the calculations processor 30. The pseudo-random number is dependent on the color plane from the selected, e.g. CMYK, color space and on the previously calculated pseudo-random number. The calculations processor 20 adds the bias value and the pseudo-random number to the input pixel value and provides this sum to a clip module 50. The result of the clip module is a final output pixel value 60. This process is performed separately for each primary color, for example, in the cyan, magenta, yellow, and black (CMYK) color space.

Table A below shows an algorithm implemented in the C computer language that generates a pseudo-random number. The method of the algorithm is based on Tausworthe generators referenced in P. L'Ecuyer, Maximally Equidistributed Combined Tausworthe Generators, *Mathematics of Computation*, 65, 213, pp. 203–213 (1996). While numerous random number generator methods may be implemented in the invention, the said Tausworthe pseudo-random number generator described below is incorporated into the presently preferred embodiment of the invention. According to L'Ecuyer, a generator is called maximally equidistributed if its vectors of successive values have the best possible equidistribution in all dimensions. L'Ecuyer shows how to find maximally equidistributed combinations in an efficient manner, and gives a list of generators with that property. Such generators have a strong theoretical support and lend themselves to fast hardware and software implementation. Following the guidelines of the paper mentioned above, two 32-bit initial values for numbers a and b are calculated using a set of parameters, (k1, k2, q1, q2, s1, s2). The pseudo-random number generator must be initialized correctly for a recurrence to perform properly. For 32-bit numbers where $k_i$ is the number of bits of noise to add, the final (32-$k_i$) bits must be zero, while the first $k_i$ bits must be uniquely chosen. Once the initial values for a and b are determined, they can be used as constants at the beginning of the method. Two mask functions, Mask1 and Mask2, are also defined to select the desired bits. The 32-bit pseudo-random number c is determined by using the exclusive or operation on said numbers a and b. Subsequent pseudo-random numbers are generated based on previously determined values. The 32-bit numbers are unsigned so that right-shifts fill with zeros.

TABLE A

Pseudo-Random Number Generator
Produce a 32-bit pseudo-random number (c00..c31).
The method mentioned
below is based on Tausworthe generators. In this case we combined
two sequences with the following ME-CF (maximally equidistributed and
collision-free) generator: (k1,k2,q1,q2,s1,s2) = (29,28,2,9,18,14).
The following C code snippet shows how to generate a pseudo-random
number:

```
L = 32; /* We are dealing with 32-bit numbers. */
/*
 * This pseudo-random number generator must be initialized correctly
 * in order for the recurrence to perform properly. Since we are
 * dealing with 32-bit numbers, the final (32-k)-bits must be zero,
 * while the first k-bits can be arbitrarily chosen.
 */
a = 0x86AC5918; /* Initially the last 3 (32–29) bits must be zero. */
```

TABLE A-continued

Pseudo-Random Number Generator
Produce a 32-bit pseudo-random number (c00..c31).
The method mentioned
below is based on Tausworthe generators. In this case we combined
two sequences with the following ME-CF (maximally equidistributed and
collision-free) generator: (k1,k2,q1,q2,s1,s2) = (29,28,2,9,18,14).
The following C code snippet shows how to generate a pseudo-random
number:

```
b = 0xC18A9140; /* Initially the last 4 (32-28) bits must be zero. */
/*
 * Now, the remaining (L-k)-bits must be uniquely determined.
 a = ((a ^ (a << q1)) >> k1) ^ a;
 b = ((b ^ (b << q2)) >> k2) ^ b;
/*
 * Alternatively, we can skip this initialization process by selecting
 * valid starting states (as computed above). Based on the initial
 * values chosen for a and b, the uniquely determined value are as
 * follows:
 */
 a = 0x86AC591C;
 b = 0xC18A914D;
/*
 * Create masks used to select the desired (k-s) bits.
 */
Mask1 = (((0xFFFFFFFF << s1) >> s1) >> (L - k1)) << (L - k1);
Mask2 = (((0xFFFFFFFF << s2) >> s2) >> (L - k2)) << (L - k2);
Tausworthe_PseudoRandom_Number_Generator()
{
/*
 * Since the initial values of a and b are valid, we can use
 * them to compute the random number prior to determining
 * the next state.
 */
 c = a ^ b; /* The 32-bit random number! */
/*
 * Compute the next values to use for a and b based on the
 * previous values.
 */
 a = (((a << q1) ^ a) >> (k1 - s1)) ^ ((a & Mask1) << s1);
 b = (((b << q2) ^ b) >> (k2 - s2)) ^ ((b & Mask2) << s2);
}
```

(The numbers are considered unsigned so that right shifts fill with zeros.)

Table B is a layout of the generated 32-bit numbers, a, b, and c at times t and (t+1). That is, the pseudo-random number generator method described above results in the bit-wise equations shown in Table B. At Q(0), the initial values for a and b are a=0x86AC591C and b=0xC18A914D. Index 00 corresponds to the most significant bit (MSB) and index 31 corresponds to the least significant bit (LSB). The number c is the pseudo-random generated number. Numbers a and b are intermediate values used in generating c.

TABLE B

At Q(0), set a = 0x86AC591C and b = 0xC18A914D (the index 00
corresponds to the MSB and the index 31 corresponds to the LSB). The
following bit-wise equations are equivalent to the code of Table A.

| Q(t) Q(t) |
| --- |
| c00 = a00 ^ b00 |
| c01 = a01 ^ b01 |
| c02 = a02 ^ b02 |
| c03 = a03 ^ b03 |
| c04 = a04 ^ b04 |
| c05 = a05 ^ b05 |
| c06 = a06 ^ b06 |
| c07 = a07 ^ b07 |
| c08 = a08 ^ b08 |
| c09 = a09 ^ b09 |
| c10 = a10 ^ b10 |
| c11 = a11 ^ b11 |
| c12 = a12 ^ b12 |

TABLE B-continued

At Q(0), set a = 0x86AC591C and b = 0xC18A914D (the index 00
corresponds to the MSB and the index 31 corresponds to the LSB). The
following bit-wise equations are equivalent to the code of Table A.

| |
| --- |
| c13 = a13 ^ b13 |
| c14 = a14 ^ b14 |
| c15 = a15 ^ b15 |
| c16 = a16 ^ b16 |
| c17 = a17 ^ b17 |
| c18 = a18 ^ b18 |
| c19 = a19 ^ b19 |
| c20 = a20 ^ b20 |
| c21 = a21 ^ b21 |
| c22 = a22 ^ b22 |
| c23 = a23 ^ b23 |
| c24 = a24 ^ b24 |
| c25 = a25 ^ b25 |
| c26 = a26 ^ b26 |
| c27 = a27 ^ b27 |
| c28 = a28 ^ b28 |
| c29 = a29 ^ b29 |
| c30 = a30 ^ b30 |
| c31 = a31 ^ b31 |

| Q(t + 1) Q(t) |
| --- |
| a00 = a18 |
| a01 = a19 |
| a02 = a20 |
| a03 = a21 |
| a04 = a22 |
| a05 = a23 |
| a06 = a24 |
| a07 = a25 |
| a08 = a26 |
| a09 = a27 |
| a10 = a28 |
| a11 = a00 ^ a02 |
| a12 = a01 ^ a03 |
| a13 = a02 ^ a04 |
| a14 = a03 ^ a05 |
| a15 = a04 ^ a06 |
| a16 = a05 ^ a07 |
| a17 = a06 ^ a08 |
| a18 = a07 ^ a09 |
| a19 = a08 ^ a10 |
| a20 = a09 ^ a11 |
| a21 = a10 ^ a12 |
| a22 = a11 ^ a13 |
| a23 = a12 ^ a14 |
| a24 = a13 ^ a15 |
| a25 = a14 ^ a16 |
| a26 = a15 ^ a17 |
| a27 = a16 ^ a18 |
| a28 = a17 ^ a19 |
| a29 = a18 ^ a20 |
| a30 = a19 ^ a21 |
| a31 = a20 ^ a22 |
| b00 = b14 |
| b01 = b15 |
| b02 = b16 |
| b03 = b17 |
| b04 = b18 |
| b05 = b19 |
| b06 = b20 |
| b07 = b21 |
| b08 = b22 |
| b09 = b23 |
| b10 = b24 |
| b11 = b25 |
| b12 = b26 |
| b13 = b27 |
| b14 = b00 ^ b09 |
| b15 = b01 ^ b10 |
| b16 = b02 ^ b11 |
| b17 = b03 ^ b12 |
| b18 = b04 ^ b13 |
| b19 = b05 ^ b14 |
| b20 = b06 ^ b15 |

TABLE B-continued

At Q(0), set a = 0x86AC591C and b = 0xC18A914D (the index 00 corresponds to the MSB and the index 31 corresponds to the LSB). The following bit-wise equations are equivalent to the code of Table A.

$$b21 = b07 \wedge b16$$
$$b22 = b08 \wedge b17$$
$$b23 = b09 \wedge b18$$
$$b24 = b10 \wedge b19$$
$$b25 = b11 \wedge b20$$
$$b26 = b12 \wedge b21$$
$$b27 = b13 \wedge b22$$
$$b28 = b14 \wedge b23$$
$$b29 = b15 \wedge b24$$
$$b30 = b16 \wedge b25$$
$$b31 = b17 \wedge b26$$

It is important that unique starting random number seeds be used on each of the color planes because noticeable artifacts may appear when the same noise value is used on the same pixels of each plane.

In the actual implementation, according to the invention, an 8-bit pseudo-random number is generated because of hardware constraints. Table C below shows that the Tausworthe generator method is still used. Also in Table C a possible initial state for one of the primary color planes is shown.

TABLE C

Produce an 8-bit pseudo-random number (c00..c07). The method mentioned below is based on Tausworthe generators. In this case we combined two sequences with the following ME-CF (maximally equidistributed and collision-free) generator: (k1,k2,q1,q2,s1,s2) = (17,15,3,4,12,6).

| Q(t) | Q(t) |
|---|---|
| c00 = a00 ^ b00 | |
| c01 = a01 ^ b01 | |
| c02 = a02 ^ b02 | |
| c03 = a03 ^ b03 | |
| c04 = a04 ^ b04 | |
| c05 = a05 ^ b05 | |
| c06 = a06 ^ b06 | |
| c07 = a07 ^ b07 | |

Initial State

| Q(0) | Q(0) |
|---|---|
| a00 = 1 | b00 = 0 |
| a01 = 0 | b01 = 1 |
| a02 = 1 | b02 = 0 |
| a03 = 0 | b03 = 0 |
| a04 = 0 | b04 = 1 |
| a05 = 1 | b05 = 0 |
| a06 = 0 | b06 = 0 |
| a07 = 0 | b07 = 1 |
| a08 = 0 | b08 = 1 |
| a09 = 0 | b09 = 1 |
| a10 = 0 | b10 = 1 |
| a11 = 0 | b11 = 0 |
| a12 = 0 | b12 = 1 |
| a13 = 0 | b13 = 1 |
| a14 = 1 | b14 = 1 |
| a15 = 1 | |
| a16 = 0 | |

Next State

| Q(t + 1) Q(t) | Q(t + 1) Q(t) |
|---|---|
| a00 = a12 | b00 = b06 |
| a01 = a13 | b01 = b07 |

TABLE C-continued

Produce an 8-bit pseudo-random number (c00..c07). The method mentioned below is based on Tausworthe generators. In this case we combined two sequences with the following ME-CF (maximally equidistributed and collision-free) generator: (k1,k2,q1,q2,s1,s2) = (17,15,3,4,12,6).

| | |
|---|---|
| a02 = a14 | b02 = b08 |
| a03 = a15 | b03 = b09 |
| a04 = a16 | b04 = b10 |
| a05 = a03 ^ a00 | b05 = b11 |
| a06 = a04 ^ a01 | b06 = b12 |
| a07 = a05 ^ a02 | b07 = b13 |
| a08 = a06 ^ a03 | b08 = b14 |
| a09 = a07 ^ a04 | b09 = b04 ^ b00 |
| a10 = a08 ^ a05 | b10 = b05 ^ b01 |
| a11 = a09 ^ a06 | b11 = b06 ^ b02 |
| a12 = a10 ^ a07 | b12 = b07 ^ b03 |
| a13 = a11 ^ a08 | b13 = b08 ^ b04 |
| a14 = a12 ^ a09 | b14 = b09 ^ b05 |
| a15 = a13 ^ a10 | |
| a16 = a14 ^ a11 | |

Figure 2:
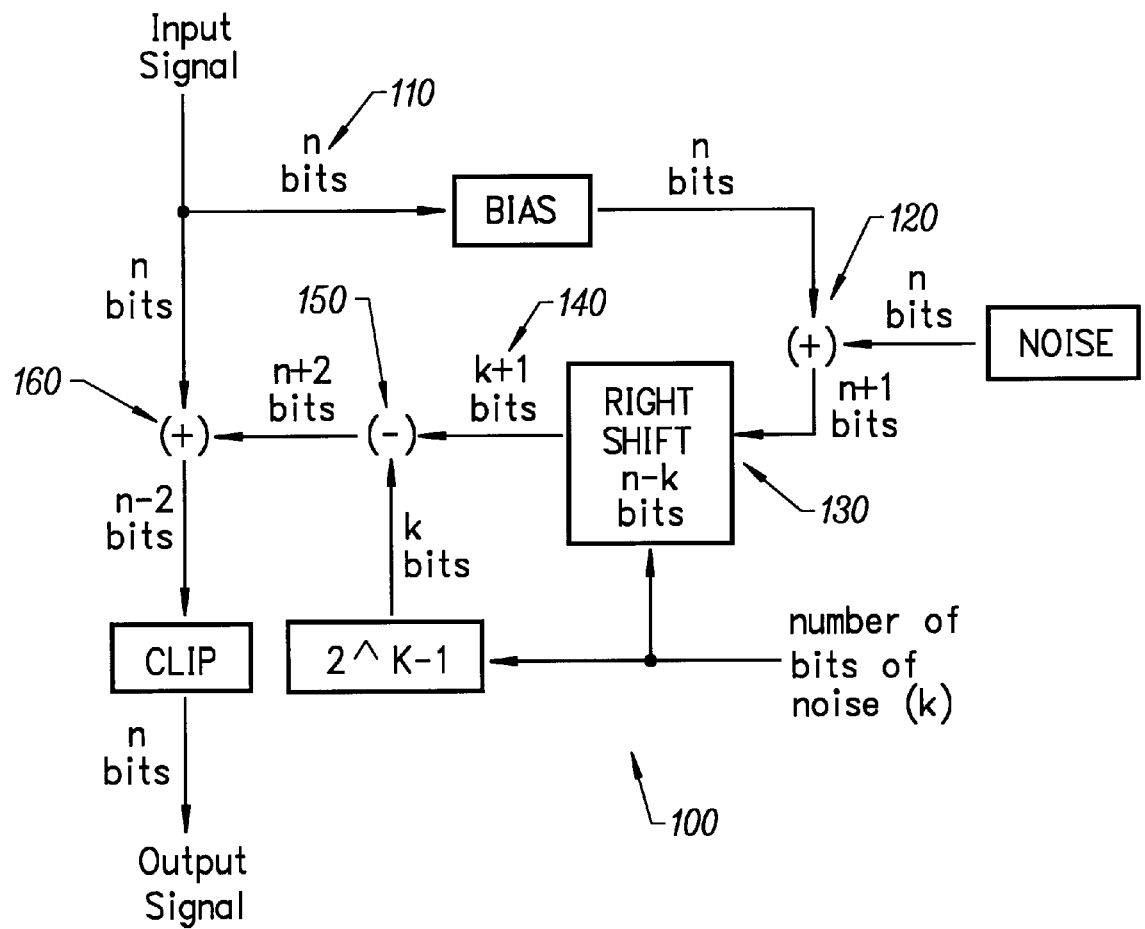
FIG. 2 is a flow diagram showing a method for adding noise and bias to a pixel to reduce banding and to produce additional highlights.

Referring to FIG. 2 a flow diagram 100 of the steps to create the output signal from the input signal is shown. Related requirements, formula and definitions are shown in Table D below. Assume, for example, that n is the number of bits of the inpit value and k is the number of bits of noise to add. Then the first step (110) is to send the input value of n bits to the bias function. The bias function is defined in Table D. In the preferred embodiment of the invention, the bias function is the standard identity function. In some embodiments of the invention, a lookup table (LUT) provides an n-bit output such as, for example, (BIAS0, BIAS1, ... ,BIAS($2^n-1$). Step (120) shows that n bits of noise are summed with the n-bits bias number to craete a n+1 bit number to allow for overflow. The n+1 bit number is right-shifted n–k bits, (130) to produce a k+1 bit number (140). Subtract from the k+1 number, the number $2^k-1$ (150). Now add the result thus far to the input signal (160) to obtain an n+2 bit number. Positive overflow is indicated in the n+1 position and negative overflow is indicated in the n+2 position. The n+2 bit number is then clipped to obtain the desired n-bit output pixel value.

TABLE D

The algorithm was developed such that it satisfied the following requirements:

1. Reduce banding.
2. Produce highlights on systems lacking highlights.
3. Have no ink map to no ink
4. Have full ink map to full ink.

Formula
  y = CLIP[x + ((BIAS[x] + r) >> j) – ((1 << k) – 1)]
Constants
  n: Number of bits of input value.
  k: Number of bits of noise to add.
  j: n - k.
BIAS: ($2^n$)-entry bias LUT with n-bit output (BIAS0 ... BIAS($2^n - 1$)).
  Bias the input value to allow for better control over the mean value of y.
CLIP: Clip the values to be within range.
Input
  x: n-bit pixel value from one of the planes (x0 ... x(n – 1)).
  r: n-bit pseudo-random number (r0 ... r(n – 1)).
Intermediate
  t: (n + 2)-bit intermediate value passed to CLIP (t0 ... t(n + 1)).
Output
  y: n-bit pixel value (y0 ... y(n – 1)).

The method described above was developed to satisfy the following requirements: to reduce banding, to produce highlights on systems lacking highlights, to have no ink map to no ink, and to have full ink map to full ink.

FIGS. 3a–3c show the computation for a case when the input signal is 8 bits and the noise added is 3 bits. In particular, FIG. 3a is a computation diagram; FIG. 3b is a diagram showing a clipping processor; and FIG. 3c is a clipping truth table. Table E below describes the bias function and shows a formula for intermediate values t for the computation example in FIG. 3.

TABLE E

Computation
The standard bias function is simply the identity function (BIAS[x] = x). The function is used to alter the mean value of the output. The standard bias function allows us to lighten the light end by lowering the mean value of light pixels, but also increases the means in the dark end.
Intermediate:
$t = x + ((BIAS[x] + r) >> j) - ((1 << k) - 1)$ Referring to FIG. 3a the bias function in the preferred embodiment of the invention is the standard identity function 200. In this FIG., the bias function is equal to the input signal value. Noise and bias are added together and right-shifted n−k, or 5 bits 210. The result is added to an initial pixel value 205. The value $2^k-1$, which in this case is 111 in binary representation 220, is subtracted from the sum of the bias, noise, and initial pixel value. The combination of using the bias function and subtracting $2^k-1$ helps to lower the mean value of pixels in the highlight region and to increase the mean value of pixels in the shadow region. The resultant number 230 is a 10-bit number to allow the detection of overflow. A positive overflow results in a 0 in the t0 bit position and a 1 in the t1 bit position 231. A negative overflow results in a 1 in the t0 bit position and the contents of the t1 position are irrelevant 232. The number t is sent to a clipping function 240 (FIG. 3b). According to the preferred embodiment of the invention, the clipping function clips in the following manner (FIG. 3c). When t0=0 and t1=1 there is positive overflow so that output value is set to full ink or all ones. When t0=0 and t1=0 there is no overflow and the output value is set to the number t 242. When t0=1 there is negative overflow and the output signal is set to no ink or all zeros 243.

Table F below shows C-code for the bias and clipping functions according to the invention.

TABLE F

```
typedef unsigned char Byte;
static Byte CLIP[1024], BIAS[256];
static int k, j;
void Add_Noise_Init(int bits)
{
    int i;
    k = bits;
    j = 8 - k;
    for (i = 0; i < 256; i++) {
        BIAS[i] = i;
        CLIP[i] = i;
        CLIP[i + 256] = 255;
        CLIP[i + 512] = 0;
        CLIP[i + 768] = 0;
    }
}
Byte Add_Noise(Byte x, Byte r)
{
    return CLIP[x + ((BIAS[x] + r) >> j) - ((1 << k) - 1)];
}
```

Figure 4:
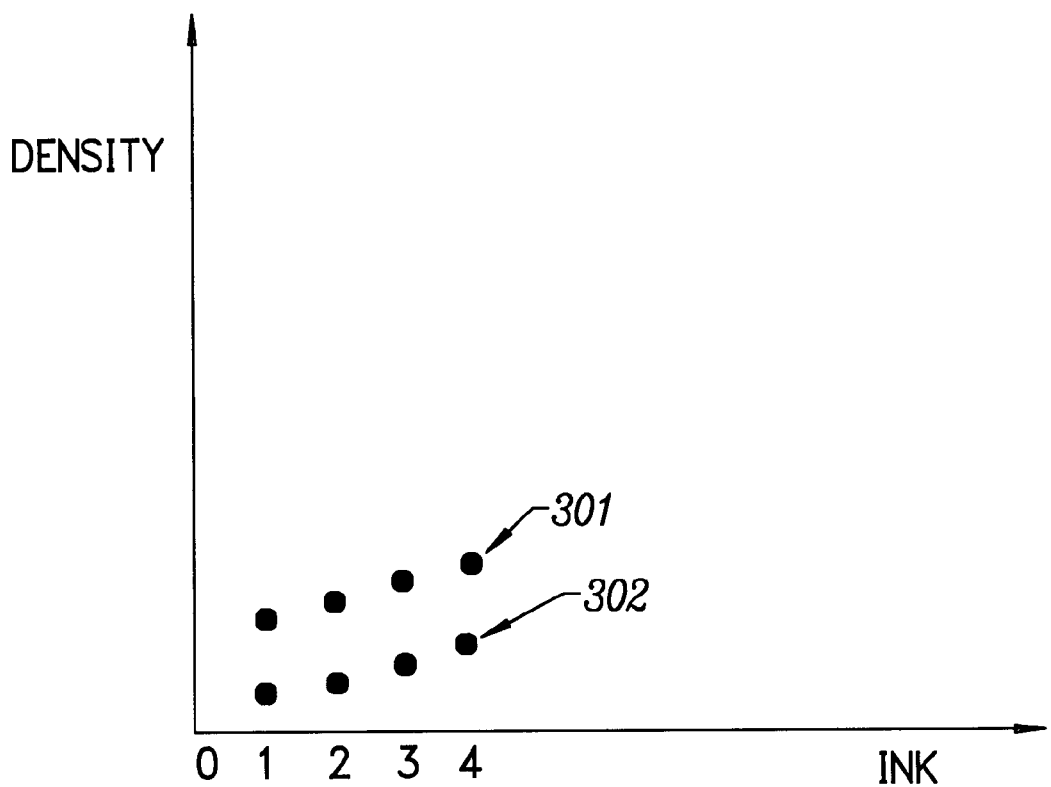
FIG. 4 shows two ink density plots.

FIG. 4 shows two partial ink density plots, one plot for the prior art, and one plot for the invention. A major advantage of the invention is to provide ink values that appear to be between two discrete values, for example, between zero and one. In prior art, the pixel values are either zero or one. Therefore, in the prior art the pixels' values discretely jump to the value one in the highlight region 301. There is no consideration given to the relative ink density produced in the highlight region. The invention mitigates the effect of the jump from zero to one by providing the appearance of a gradual increase in density in the highlight region 302. Therefore, an advantage of the invention is to provide more highlights.

Figure 5A:
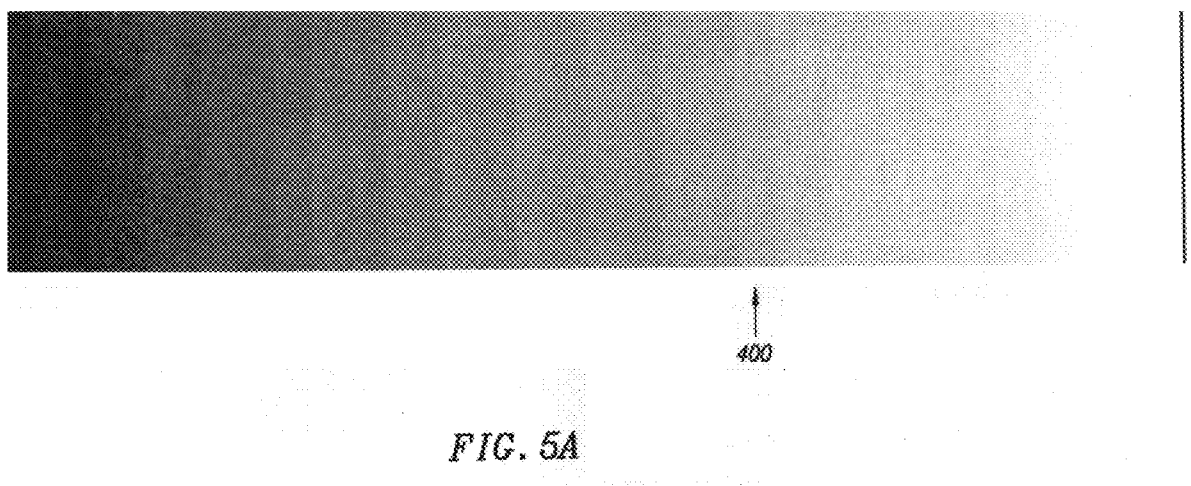
FIG. 5a is a printed page in grayscale showing banding.
Figure 5B:
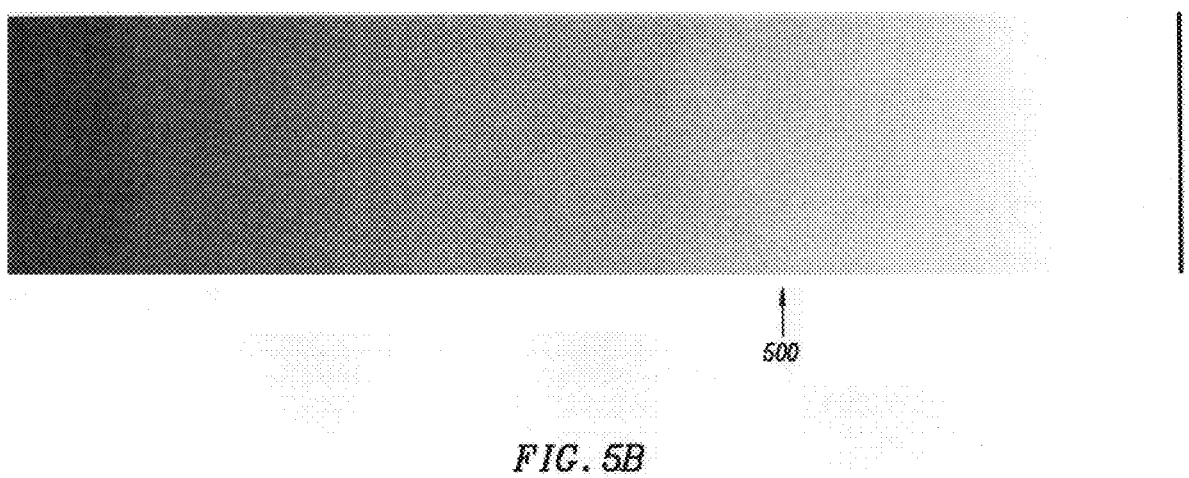
FIG. 5b is a printed page in grayscale showing reduction of banding.

FIG. 5a is a printed test page in grayscale showing banding. No noise is added to the input signals. Banding is discernible in regions including for example 400. FIG. 5b is a printed test page in grayscale showing reduction of banding. In FIG. 5b the banding is significantly reduced 500 because pseudo-random noise and bias are added to input signals in accordance with the invention.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

I claim:

1. A method for reducing banding in printed images, comprising the steps of:

providing an input pixel to a calculations processor and to a bias function processor;

generating a random value;

providing the output of the bias function processor and the random number to said calculations processor;

performing calculations on the input pixel value, the bias function value, the random number and a predetermined number in the calculations processor;

clipping an output pixel value of the calculations processor value with the same number of bits as the corresponding input pixel to allow a value for no ink that is not random, but is mapped to a first value and a value for full ink that is not random, but is mapped to a second value; and providing the pixel value from the clipping step as an input value to an image rendering or printing device.

2. A method as in claim 1, wherein additional highlights are added by performing calculations on the input pixel value, the bias function value, the random number, and the predetermined number in the calculations processor to render pixel values where a value for no ink is mapped to a value for no ink and a value for full ink is mapped to a value for full ink.

3. A method as in claim 1, wherein clipping the output of the calculations processor comprises the following steps:

setting the final n bit output pixel value to zero if the value in the n+2 position is one;

setting the final n bit output pixel value to $2^n-1$ if the value in the n+2 position is zero and the value in the n+1 position is one; and setting the final n bit output pixel value to the first n bits of the input signal passed to the clipping method if the value in the n+2 position is zero and the value in the n+1 position is zero.

4. A method as in claim 1, wherein generating a random value further comprises the step of:

implementing a maximally equidistributed combined Tausworthe generator.

5. A method as in claim 4, wherein an 8-bit pseudo-random number c is generated according to the following steps:

setting the parameters (k1, k2,q1, q2,s1, s2);

determining the initial values for numbers a and b;

determining the bit-wise equations that include, for example, assignments and exclusive or operations, which calculate the next state of numbers a and b; and generating the pseudo-random number c from applying the exclusive or operation on the first 8 bits of numbers a and b.

6. A method as in claim 1, wherein the step of performing calculations further comprises the steps of:

adding the bias function value to the random number;

right-shifting the sum of the bias and the random number by n−k bits, where n is the number of bits of input value and k is the number of bits of noise to add;

adding said input pixel value to the results of said right-shifting step; and subtracting the number, $2^k-1$, where k is the number of bits of noise to add.

7. A method as in claim 1, wherein the step of clipping the output of the calculations processor includes passing an n+2 bit number to the clipping step, where n is the number of bits of input value.

8. A method as in claim 6, wherein performing calculations further comprises the steps of:

adding the bias value and the random noise that results in an (n+1)-bit number that allows for overflow;

right-shifting n−k bits resulting in a (k+1) bit number;

adding said input pixel value to the results of said right-shifting step; and subtracting a k bit number ($2^k-1$) from the sum of the previous step, resulting in an n+2 bit number that allows for overflow.

9. A method as in claim 6, further comprising the following steps:

indicating positive overflow in the n+1 position; and indicating negative overflow in the n+2 position.

10. An apparatus for rendering a representation of a continuous image by providing output pixel values, wherein each pixel value represents an intensity of a corresponding input pixel of an image to be rendered, said apparatus comprising:

a calculations processor to perform bit-wise operations on bit values;

a bias function processor to generate a bias function value provided to the calculations processor;

a random value generator to provide a random number to the calculations processor;

a clipping module for providing an output pixel value of a same number of bits as an input signal;

means for passing an input pixel value to a bias function processor and a calculations processor for further calculations;

means for generating a random noise value;

means for passing said random noise value to said calculations processor for further calculations;

means for generating a bias value from said bias function processor;

means for passing said bias value to said calculations processor for further calculations;

means for performing calculations on the input pixel value, the bias function value, the random number and a predetermined number in the calculations processor, thereby reducing banding effects;

means for clipping the output of the calculations processor, to provide an output pixel value with the same number of bits as the corresponding input value and to allow a value of no ink that is not random, but is mapped to a first value, and a value of full ink that is not random, but is mapped to a second value; and means for providing the output pixel values from the clipping module as intensity input pixel values to an image rendering or printing device.

11. An apparatus as in claim 10, wherein the means for generating a bias value from said bias function processor further comprises:

means for looking up a ($2^n$)-entry lookup table (LUT) and retrieving an n-bit output (BIAS0, BIAS1, . . . , BIAS($2^n-1$)); and means for setting the bias function to a standard identity function.

12. An apparatus as in claim 10, wherein the means for performing calculations on the input pixel value, the bias function value, the random number and a predetermined number in the calculations processor further comprises:

means for adding the bias value and the random number and thereby producing an n+1 bit number that allows for overflow;

means for shifting the above mentioned n+1 bit number to the right by n−k bits thereby rendering k bits of noise value, where k is the requested number of bits of noise to add;

means for adding said input pixel value to said right-shifted n+1 number;

means for subtracting a predefined number $2^k-1$ to render a n+2 bit number that allows for overflow;

means for indicating positive overflow in the n+1 position; and means for indicating negative overflow in the n+2 position.

13. An apparatus as in claim 10, wherein the means for clipping the output of the calculations processor further comprises:

means for retrieving an n+2 bit number from the calculations processor as input;

means for reading the n+2 bit, determining if it is zero, and rendering an n bit number with all bits set to zero if the n+2 bit is one to ensure that a value of no ink is mapped to a value of no ink;

means for reading the n+1 bit, when the n+2 bit is zero and for determining when the n+1 bit is one, and rendering an n bit number with all bits set to one if the n+1 bit is one to ensure that a value of full ink is mapped to a value of full ink; and means for reading the n+1 bit, when the n+2 bit is zero, and for determining when the n+1 bit is zero, thereby rendering an n bit number to be equal to the first n bits of the input n+2 bit number so that a pixel having an intensity value within range is unmodified.

14. An apparatus as in claim 10, wherein the means for generating a random noise number further comprises:

means for setting the parameters (k1, k2, q1, q2,s1, s2);

means for determining the initial values for numbers a and b;

means for determining the bit-wise equations that may include assignments and exclusive or operations, which calculate the next state of numbers a and b; and means for generating the pseudo-random number c from applying the exclusive or operation on the first 8 bits of numbers a and b.

15. A method for reducing banding in printed images, comprising the steps of:

adding a random noise value and a bias function value to an input pixel value;

shifting the sum of the random noise value and the bias function value a predetermined number of spaces;

adding an initial input pixel value to the results of said shifting step;

subtracting a predetermined constant from the results of said addition; and applying a clipping procedure to the results of the step to provide a final output value.

16. An apparatus for reducing banding in printed images, comprising:

a bias function processor to provide a bias function value;

a random noise generator to provide a random noise value;

a calculations processor for performing bit-wise operations;

said calculations processor:

adding a random noise value and a bias function value to an input pixel value;

shifting the sum of the random noise value and the bias function value a predetermined number of spaces;

adding an initial input pixel value to the results of said shifting step;

subtracting a predetermined constant from the results of said addition;

adding an initial input pixel value to the results of said subtraction; and applying a clipping procedure to the results of the previous step to provide a final output value.

\* \* \* \* \*